2,936,325
SUBSTITUTED AMIDES AS SELECTIVE SOLVENTS FOR AROMATIC HYDROCARBONS

Nathaniel L. Remes, Miami, Fla., and Thomas W. Martinek and Le Roi E. Hutchings, Crystal Lake, Ill., assignors to The Pure Oil Company, Chicago, Ill., a corporation of Ohio No Drawing. Application December 27, 1957
Serial No. 705,472

17 Claims. (Cl. 260—674)

This invention relates to a new class of selective solvents for the removal of aromatic hydrocarbons and alkyl-substituted homologues thereof from non-aromatic hydrocarbon mixtures containing same.

The selective solvents of this invention may be described by the general formula,

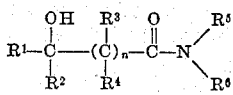

wherein $R^1$ through $R^6$ may be hydrogen and alkyl groups, and $n$ is a small whole number from 0 to 6 such that the total number of carbon atoms in that portion of the molecule attaching to the carbonyl group is 15 or less. The alkyl groups $R^1$ through $R^6$ may contain substituents groups such as hydroxyl, alkoxy, nitro, and cyano groups. Preferably, the alkyl groups $R^5$ and $R^6$ attaching to the nitrogen atom do not contain a total of more than 8 carbon atoms.

Non-limiting specific examples of compounds coming within the scope of the foregoing formula and definition are:

N-methylglycolamide
N,N-dimethylglycolamide
N-ethylglycolamide
N,N-diethylglycolamide
N-methyllactamide
N,N-dimethyllactamide
N-methylhydracrylamide
N,N-dimethylhydracrylamide
N-ethylhydracrylamide
N,N-diethylhydracrylamide
N,N-dimethyl-α-hydroxybutyramide
N-ethyl-α-hydroxybutyramide
N,N-diethyl-α-hydroxybutyramide
N-methyl-α-hydroxyisobutyramide
N,N-dimethyl-α-hydroxyisobutyramide
N-ethyl-α-hydroxyisobutyramide
N,N-dimethyl-α-hydroxy-β,β-dimethylbutyramide
N,N-dimethyl-α-hydroxy-β-ethyldimethylbutyramide
N-methyl-α-hydroxy-β,β-dimethylbutyramide
N,N-dimethyl-β-hydroxybutyramide
N-ethyl-β-hydroxybutyramide
N-methyl-β-hydroxybutyramide
N-methyl-α-hydroxybutyramide
N,N-dimethyl-α-hydroxybutyramide
N-methyl-α-hydroxyvaleramide
N,N-dimethyl-α-hydroxyvaleramide
N-methyl-α-hydroxyisovaleramide
N,N-dimethyl-α-hydroxyisovaleramide
N-methyl-α-hydroxypropionamide
N,N-dimethyl-α-hydroxypropionamide
N-methyl-α-acetoxypropionamide
N,N-dimethyl-α-acetoxypropionamide The foregoing compounds are different from the amides such as N,N-dimethylacetamide or N,N-dimethylformamide in that they contain a hydroxyl group attached to either the alpha or beta carbon atom in relation to the carbonyl carbon atom. This forms a series of compounds generally classifiable as lactamides or hydracrylamides in which the nitrogen contains at least one methyl group and no more than the equivalent of two butyl groups. Thus, although the hydroxyl group is a known functional group to increase the solvent characteristics, it is unexpected to find such enhancement in this molecular arrangement because lactamides are not used as solvents and acetamides are used both as solvents and anti-solvents. Accordingly, the class of compounds presented herein as selective solvents are unique in their properties.

It is generally accepted in the solvent extraction art that a determination of the solubilities of benzene, as a representative aromatic hydrocarbon, and heptane, as a representative non-aromatic hydrocarbon in the solvent is both a reliable and accurate method of screening the solvents. Such screening tests were employed herein to include a large number of amides, acetamides, a commercially available polyhydroxy solvent, and species of solvents coming within the purview of this invention. The results are shown in Table I.

TABLE I

*Solubilities of benzene and heptane in certain amides*

| Solvent | Volume of Solvent Phase [1] | | |
|---|---|---|---|
| | Benzene | Heptane | 30% Benzene, 70% Heptane |
| N-methylacetamide | miscible | 5.3 | 6.2 |
| N,N-dimethylacetamide | do | 5.6 | 8.2 |
| N,N-diethylacetamide | | miscible | |
| N-isopropylacetamide | | do | |
| N,N-diisopropylacetamide | | do | |
| N-methyl-α-hydroxypropionamide.[2] | 7.5 | 5.0 | 5.5 |
| N,N-dimethyl-α-hydroxypropionamide.[2] | miscible | 5.38 | 6.9 |
| N-methyl-2-acetoxypropionamide | do | 5.4 (60° C.) | 6.6 (60° C.) |
| N,N-dimethyl-2-acetoxypropionamide | do | 5.3 | 6.9 |
| Diethylene glycol | 8.25 | 5.03 | 5.5 |
| N-morpholinyllactamide | miscible | 5.0 | 5.97 |

[1] Volume of solvent phase (ml.) after thoroughly mixing 5 ml. of the solvent and 5 ml. of the hydrocarbon or hydrocarbon mixture.
[2] Also called N-methyl and N,N-dimethyllactamide.

The tests in Table I were conducted by shaking 5 ml. portions of benzene or heptane with a 5 ml. portion of the solvent under consideration in a graduated mixing cylinder until no further volume changes were visible in the two phases present. The increase in volume of the solvent phase in accordance with the accepted procedure for this test is considered to be an indication of the solubility of the hydrocarbon in the solvent. Since the selectivity of a solvent is dependent to a large extent on the solubility of aromatics and insolubility of non-aromatics in it, those solvents in which benzene was found to be relatively more soluble than heptane were considered to have promise as selective solvents for aromatics. As a further measure of selectivity, the more promising solvents were tested on a mixture consisting of 30% v. benzene and 70% heptane. In this series of supplementary tests, 5 ml. of the benzene-heptane mixture were shaken with 5 ml. of the solvent in a graduated mixing cylinder until the volumes of the phases became constant, and the increase in the volume of the solvent phase was considered to be due to dissolution of benzene and heptane. From the earlier determination of heptane solubility in the solvent, the ratios of benzene to heptane in solution in the solvents were estimated and approximate selectivities determined. Results of these tests are also shown in Table I.

More precise selectivities were determined by repeating the extraction from the benzene-heptane mixture and determining the composition of the raffinate by means of refractive index observations and use of a previously-prepared refractive index-composition curve. Results of these tests on N-methyllactamide are shown in Table II in comparison with N-methylacetamide and diethylene glycol.

TABLE II

*Determination of selectivities of specific amides* [1]

| Solvent | Raffinate, Percent Benzene [2] | Extract plus Solvent Total Vol. (cc.) | Extract | | Selectivity (percent) |
|---|---|---|---|---|---|
| | | | Benzene | Heptane | |
| N-methylacetamide | 18 | 6.2 | 0.8 | 0.4 | 67 |
| N-methyllactamide | 22.5 | 5.5 | 0.49 | 0.01 | 98 |
| Diethylene glycol | 22.5 | 5.5 | 0.49 | 0.01 | 98 |

[1] 5 ml. of solvent mixed with 5 ml. of mixture containing 30% benzene and 70% heptane.
[2] Composition determined by observing refractive index and referring to previously-prepared plot of composition vs. R.I.

The new solvents of this invention may be used with small amounts of water or other auxiliary solvents to modify and improve the selectivity and capacity. The hydroxy-substituted acetamides of this invention are stable and may be used at temperatures ranging from subatmospheric up to the boiling point of the solvent or lowest-boiling constituent in this hydrocarbon feed stock. Table III gives a further comparison of the experimentally determined physical properties of N-methylacetamide and diethylene glycol with several of the species of solvents of this invention.

TABLE III

*Physical properties of specific amides*

| Compound | B.P. (° C.) mm. Hg | R.I. ($n^{20}_D$) |
|---|---|---|
| N-methylacetamide | 205/740 | 1.4338 |
| N,N-dimethylacetamide | 170/745 | 1.4293 |
| N-methyllactamide | 107-10/1.3 | |
| N,N-dimethyllactamide | 62-64/1.0 | 1.4579 |
| N-methyl-α-acetoxypropionamide | 88-98/1.2 | |
| N,N-dimethyl-α-acetoxypropionamide | 60.5-62/0.8 | 1.4503 |
| Diethylene glycol | 95-97.5/1.4 | 1.4464 |

In applying the solvents of this invention to an extraction, known procedures are used including batch, countercurrent or co-current techniques in one or a series of contact towers. The process disclosed in co-pending patent application by Thomas W. Martinek et al., Serial Number 705,699, filed December 27, 1957, entitled "Extraction Process," may be used. In general, the steps involve introduction of the feed hydrocarbon into the bottom of an extraction tower of the ordinary type to flow upwardly against a downwardly flowing stream of solvent. The temperature of contact is maintained at about 70° to 140° F. and pressures from atmospheric to about 25 p.s.i.g. in the extraction tower. Solvent-to-feed ratios of from 0.5:10 to 10:1 may be used. An extract phase comprising the major proportion of solvent and the aromatic hydrocarbons is removed continuously from the bottom of the tower and subjected to any one of several methods of separation for recovery of the aromatics therefrom and purification of the solvent.

For this purpose the extract phase may be distilled where the solvent boils at a temperature above the boiling point of the aromatics. Bottoms comprising the solvent denuded of extract hydrocarbons may be further purified before recycle back to the extraction tower or recycled without further purification. Solvent-to-feed reflux ratios of from about 1:10 to 1:2 may be used. Overhead from the distillation, comprising aromatics and any auxiliary solvent that may be used, is subjected to separation and the top layer of aromatics is washed to produce the finished product.

Another method of treating the extract phase from the primary extraction is by means of a secondary extraction using a secondary solvent having a high affinity for the aromatics present. Secondary solvents such as high-boiling paraffins, white oil, and kerosene may be used for this purpose. The second extract phase from this treatment, comprising the secondary solvent and the aromatics, is distilled to recover the purified product, and the bottoms of high-boiling secondary solvent is recovered for recycle. An intermediate water-wash step may be employed to remove any traces of solvent from the overhead secondary extract. The second raffinate phase from this treatment is water-washed to remove any solvent present and the resulting paraffinic phase may be discarded or sent in part to the primary extraction tower as reflux.

The raffinate from the primary extraction is produced as the top phase in the extraction tower, and is water-washed and recovered as a blending stock for other uses. The combined water-wash streams from the foregoing steps are sent to a common solvent-recovery system for distillation to recover the solvent for recycle to the primary extraction. Since the process techniques aforementioned are well known in the art, no further details are necessary.

The process of this invention is applicable to a wide variety of extraction conditions and methods of product recovery. Solvent-to-feed ratios of from about 0.5:1 to as high as 10:1 may be used. The extraction conditions may vary from ambient temperatures and atmospheric pressures to temperatures as high as the boiling point of the particular polar-amide solvent used. Pressures up to 30 p.s.i.g. or more may be applied to maintain the solvent in the liquid phase, thus allowing the use of higher temperatures. Where liquid-vapor contact is employed, the feed is introduced in vaporized form and refluxed with the liquid phase solvent.

The solvents of this invention may be used with or without an auxiliary or anti-solvent such as water, water-alcohol mixtures, and auxiliary solvents as are known in the art. Also, mixtures of two or more of the species of solvents may be used. In general, between about 0% to 25% by volume of the auxiliary solvent or anti-solvent, such as water, may be used. Adjustments in the amount of water may be made to attain the highest degree of efficiency of extraction for any given polar amide and feed combination or extraction condition, and same are considered to be within the scope of this invention.

The process of this invention is applicable to the treatment of any type of hydrocarbon mixture from which economical amounts of aromatics, including benzene and alkyl homologues thereof, can be recovered. Such mixtures include products obtained from aromatization and similar reactions. The products obtained from catalytic reforming, hydrocracking and dehydrocyclization processes may be used as feed for the present process. Any mixtures containing a paraffinic or naphthenic-type hydrocarbon admixed with benzene, toluene, the xylenes, that is, o-xylene, m-xylene and p-xylene, and also ethyl benzene, as simple or complex multi-component mixtures, may be used as the starting material. Such feed materials as petroleum distillates, naphthas, gasoline, kerosene, fuel oil fractions, and gas oil fractions may be used. The charge material should be liquid at ordinary temperatures and not subject to decomposition at the extraction temperatures or reaction with the selective solvents used herein. One suitable charge oil is the class of products known in the art as catalytic reformates. These liquid products contain a fair concentration of desirable aromatic hydrocarbons. Catalytic reformates are obtained by treating naphthas to reforming, dehydrogenation, hydrocracking and dehydrocyclization reactions at temperatures ranging from 850° F. to about 1000° F. with pressures up to 500 p.s.i.g. in the presence of a metal-containing catalyst.

As a more specific illustration, catalytic reformates obtained as a result of the treatment of a virgin naphtha (BR 175° F.–400° F., API gravity 50° to 60°) with a platinum-alumina catalyst at 875° F. to 975° F. and pressures ranging from 200 to 500 p.s.i.g., may be used. Reformates so produced contain from about 30 to 55 vol. percent of aromatics and constitute a preferred feed for the present process. For example, reformates produced by reforming a 200°–400° F. virgin naphtha at about 930° F. and 325 p.s.i.g., in the presence of a catalyst comprising about 0.1 wt. percent of platinum on an alumina base, are representative. In general, these reformates have a boiling range of about 125° to 400° F., an API gravity of 40° to 50°, and an aromatic content of 45–55 volume percent. A particularly suitable reformate is obtained by subjecting a charge naphtha having a boiling range of 178° F. to 389° F., an API gravity of 59.1°, a RON clear, of 44.6, a RON+0.3 TEL of 1.4 and containing 0.01% sulfur, about 91.0 vol. percent of paraffins and naphthenes, 1.0 vol. percent olefins, and 8.0 vol. percent aromatics, to reforming at about 930° F., to produce a product having an API gravity of 49.2°, and IBP of 128° F., and EBP of 405° F., a RON clear, of 89.4, a RON+.3 cc. TEL of 98.2, and containing about 48.0 vol. percent paraffins and naphthenes, 1.0 vol. percent olefins and 51.0 vol. percent of aromatics. By precise fractionation and blending to different octane numbers, it was determined that this reformate feed material exhibited the following analysis.

TABLE IV

*Aromatics in reformate feed*

| Aromatics: | Vol. percent |
|---|---|
| Benzene | 4.19 |
| Toluene | 13.1 |
| Mixed xylene and ethyl benzene | 16.51 |
| C₉ and heavier | 17.2 |

Examples of the composition of other reformate feed hydrocarbons that may be used are shown in Table V giving the volume percent of aromatics in each, and the research octane level to which the reforming reaction was directed in each instance.

TABLE V

*Aromatics distribution in various reformates [1] (volume percent)*

| Aromatic | 85 Research Octane Level | 95 Research Octane Level |
|---|---|---|
| Benzene | 2.96 | 3.41 |
| Toluene | 9.64 | 12.9 |
| Ethyl-benzene | 2.55 | 2.72 |
| p-xylene | 2.74 | 2.83 |
| m-xylene | 6.45 | 6.73 |
| o-xylene | 3.96 | 3.81 |
| C₉ and heavier aromatics | 17.3 | 22.4 |
| Total | 45.6 | 54.8 |

[1] These reformate products were from different feed stocks.

In general these feed stocks contain a mixture in various proportions of i-butane, n-butane, i-pentane, n-pentane, cyclopentane, 2,2-dimethylbutane, 2,3-dimethylbutane, 2-methylpentane, 3-methylpentane, n-hexane, methylcyclopentane, 2,2-dimethylpentane, benzene, 2,4-dimethylpentane, cyclohexane, 2,2,3-trimethylbutane, 3,3-dimethylpentane, 1,1-dimethylcyclopentane, 2,3-dimethylpentane, 2-methylhexane, cis-1,3-dimethylcyclopentane, trans-1,2-dimethyl cyclopentane, 3-ethylpentane, n-heptane, 2,2,4-trimethylpentane, cis-1,2-dimethylpentane, methylcyclohexane, methylethylcyclopentane, and other C₈ hydrocarbons, toluene ethylbenzene, p-xylene, o-xylene and m-xylene. These represent the types of hydrocarbon mixtures from which the aromatics, as enumerated, can be separated by the present process. In using reformates as feed hydrocarbons, one purpose is to separate the low-octane components so that they may be recycled or otherwise upgraded in octane number, and the high-octane products recovered for gasoline blending.

Another type of feed mixture comprises various fractions and mixtures of fractions of reformates which may be used in this invention. For example, a reformate or other source of aromatics may be fractionated to form a benzene concentrate, a toluene concentrate and a xylene concentrate; these may be individually treated or mixed in various proportions and treated to solvent extraction in accordance with this invention to obtain products having a high concentration of the desired aromatic. One such feed material comprises a synthetic mixture of 1 part benzene concentrate, 2 parts toluene concentrate and 1 part xylene concentrate. The purpose of treating such concentrates is to recover aromatics of maximum purity for use as organic intermediates, solvents, etc.

What is claimed is:

1. The process of separating aromatic hydrocarbons from a mixture containing aromatics and non-aromatic hydrocarbons which comprises contacting said mixture with an amide solvent of the following general formula

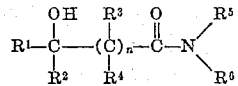

wherein $R^1$, $R^2$, $R^3$, $R^4$, $R^5$ and $R^6$ are selected from the group consisting of hydrogen and alkyl groups and $n$ has a value of 0 to 6 such that the total number of carbon atoms in that portion of the molecule attaching to the carbonyl group is no more than 15 and recovering aromatic hydrocarbons from the extract phase formed.

2. The process in accordance with claim 1 in which $R^5$ and $R^6$ are alkyl groups having a total of no more than 8 carbon atoms.

3. The process in accordance with claim 2 in which $R^5$ is a methyl group.

4. The process in accordance with claim 2 in which $R^5$ and $R^6$ are butyl groups.

5. The process in accordance with claim 1 in which $R^1$, $R^2$, $R^3$ and $R^4$ are hydrogen and $R^5$ and $R^6$ have a total of no more than 8 carbon atoms.

6. The process in accordance with claim 5 in which $n=1$.

7. The process in accordance with claim 6 in which $R^5$ and $R^6$ are methyl groups.

8. The process in accordance with claim 1 in which $R^1$, $R^2$, $R^3$ and $R^4$ are alkyl groups at least one of which contains a substituent group selected from the group consisting of hydroxyl, alkoxy, nitro and cyano groups.

9. The process in accordance with claim 8 in which said substituent group is a hydroxyl group.

10. The process in accordance with claim 8 in which said substituent group is an alkoxy group.

11. The process in accordance with claim 8 in which said substituent group is a nitro group.

12. The process in accordance with claim 8 in which said substituent group is a cyano group.

13. The process in accordance with claim 1 in which said aromatic hydrocarbons are selected from the group consisting of benzene, toluene, ethylbenzene, o-xylene, m-xylene, p-xylene and their mixtures.

14. The process in accordance with claim 1 in which said hydrocarbon mixture comprises a catalytic reformate having a boiling range of about 100° to 450° F.

15. The process in accordance with claim 1 in which said hydrocarbon mixture comprises a mixture of a benzene concentrate, a toluene concentrate and a xylene concentrate resulting from the fractionation of a catalytic reformate having a boiling range of about 100° F. to 450° F.

16. The process of separating aromatic hydrocarbons from a mixture containing aromatics and non-aromatic hydrocarbons which comprises contacting said mixture with N-methyl-α-hydroxy propionamide, separating the composite mixture into two phases consisting of a raffinate phase and an extract phase, and recovering aromatic hydrocarbons from said extract phase.

17. The process of separating aromatic hydrocarbons from a mixture containing aromatics and non-aromatic hydrocarbons with comprises contacting said mixture with N,N-dimethyl-α-hydroxypropionamide, separating the composite mixture into two phases consisting of a raffinate phase and an extract phase, and recovering aromatic hydrocarbons from said extract phase.

No references cited.